US012388716B2

(12) United States Patent
Sardesai et al.

(10) Patent No.: US 12,388,716 B2
(45) Date of Patent: Aug. 12, 2025

(54) COMPARING NETWORK TOPOLOGY, STATES, AND CONFIGURATION AT DIFFERENT TIME INSTANCES

(71) Applicant: Hewlett Packard Enterprise Development LP, Spring, TX (US)

(72) Inventors: Rohit Prabhakar Sardesai, Bengaluru (IN); Tathagata Roy, Bangalore (IN); Bhumireddy Ujvala, Bangalore (IN); Ajay Vishwanath Bhande, Bangalore (IN); Sriram Srinivasa Murthy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 7 days.

(21) Appl. No.: 18/477,353

(22) Filed: Sep. 28, 2023

(65) Prior Publication Data

US 2025/0112830 A1 Apr. 3, 2025

(51) Int. Cl.
*H04L 12/24* (2006.01)
*H04L 41/0803* (2022.01)
*H04L 41/12* (2022.01)

(52) U.S. Cl.
CPC .................... *H04L 41/12* (2013.01)

(58) Field of Classification Search
CPC ........................................ H04L 41/12
USPC .......................................... 709/238
See application file for complete search history.

(56) References Cited

U.S. PATENT DOCUMENTS

| 7,583,587 | B2 | 9/2009 | Qiu et al. |
| 7,606,165 | B2 | 10/2009 | Qiu et al. |
| 7,613,105 | B2 | 11/2009 | Bahl et al. |
| 9,059,901 | B1* | 6/2015 | Kumar C S .......... H04L 49/253 |
| 10,503,727 | B2 | 12/2019 | Laethem et al. |
| 11,863,298 | B1* | 1/2024 | Kratz ..................... H04L 7/0029 |
| 2008/0037532 | A1* | 2/2008 | Sykes ..................... H04L 65/80 |
| | | | 370/389 |
| 2010/0110932 | A1* | 5/2010 | Doran ..................... H04L 41/22 |
| | | | 370/254 |
| 2014/0358812 | A1 | 12/2014 | Hourte et al. |

(Continued)

FOREIGN PATENT DOCUMENTS

EP 2680494 A1 1/2014
WO 2004/046953 A1 6/2004

*Primary Examiner* — Ario Etienne
*Assistant Examiner* — Elizabeth Kassa
(74) *Attorney, Agent, or Firm* — Yao Legal Services, Inc.

(57) ABSTRACT

A network management system for orchestrating a network is provided. During operation, the system generates a graph representing the network. A respective vertex corresponds to an entity in the network, and a respective edge indicates a relationship between a vertex pair. The system can determine a first and a second timestamps for a respective edge. The first timestamp indicates a time instance when a relationship indicated by the edge is established. The second timestamp indicates a time instance when the relationship is terminated. The time range between the first and second timestamps indicates an active period for the edge. The system then receives, from an interface of the system, an instruction for comparing the topology, states, and configuration of the network. The system determines the topology, states, and configurations of the network at a target time instance indicated by the instruction by traversing the active edges of the graph.

20 Claims, 13 Drawing Sheets

(56) References Cited

U.S. PATENT DOCUMENTS

| | | | |
|---|---|---|---|
| 2017/0003959 A1* | 1/2017 | Giral | G06F 11/3079 |
| 2017/0279668 A1* | 9/2017 | Shevenell | H04L 41/0213 |
| 2021/0160142 A1* | 5/2021 | Thai | H04L 41/22 |
| 2022/0107831 A1 | 4/2022 | Chawathe | |
| 2023/0254217 A1* | 8/2023 | Zacharias | H04L 41/12 |
| | | | 709/220 |
| 2024/0007342 A1* | 1/2024 | Gupta | H04L 41/16 |
| 2024/0022498 A1* | 1/2024 | Gelman | H04L 45/128 |

* cited by examiner

COMPARING NETWORK TOPOLOGY, STATES, AND CONFIGURATION AT DIFFERENT TIME INSTANCES

BACKGROUND

Switches in a network may support different protocols and services. Furthermore, the switches can be distributed among different locations (e.g., sites) of the network. Identifying errors and misconfigurations in such a complex network may require efficiently determining changes in the network.

BRIEF DESCRIPTION OF THE FIGURES

In the figures, like reference numerals refer to the same figure elements.

DETAILED DESCRIPTION

Figure 1:
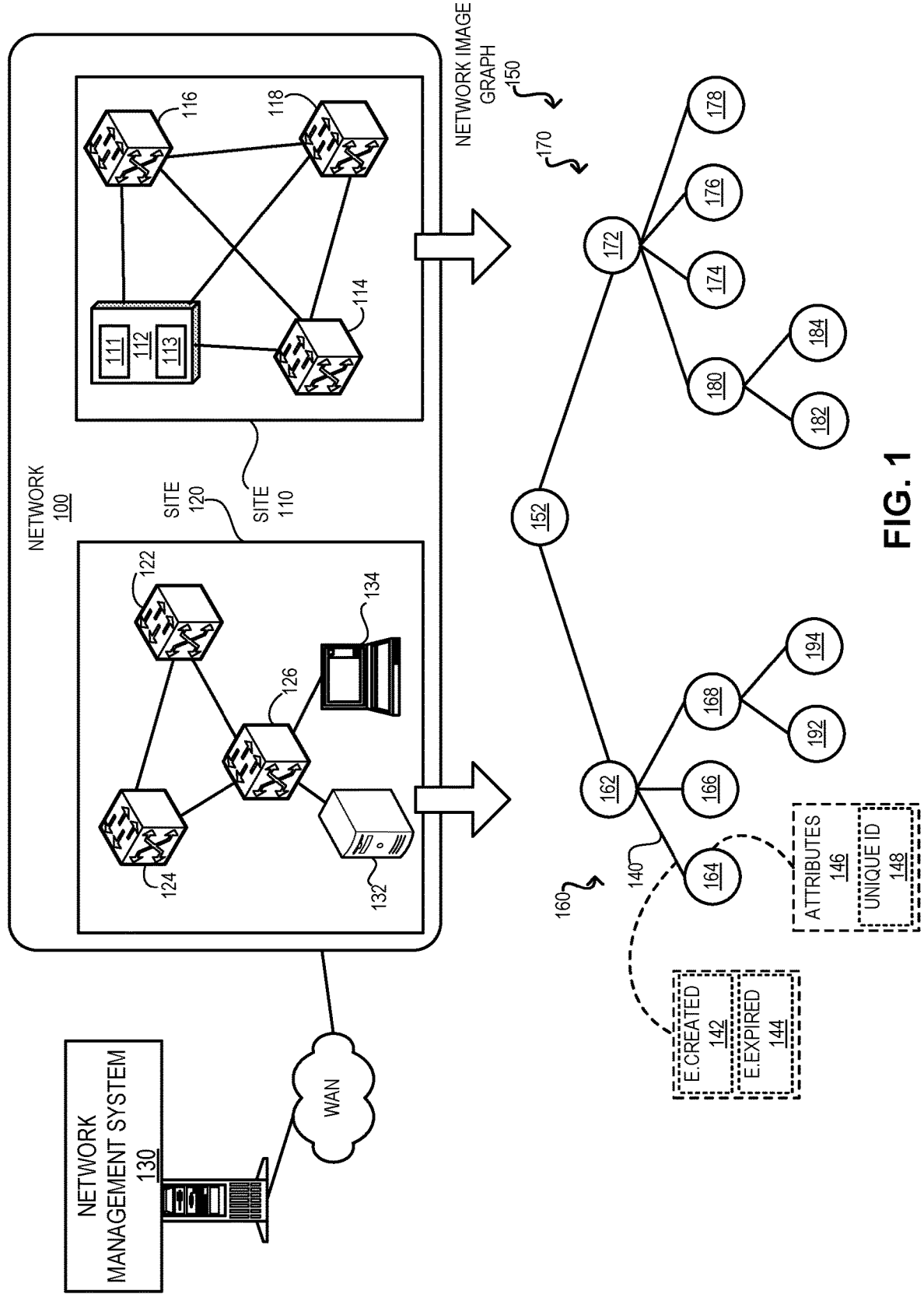
FIG. 1 illustrates an example of a network management system (NMS) representing a network using a network image (NI) graph, in accordance with an aspect of the present application.

High-capacity interconnects are the delivery medium for a variety of applications running on physical and virtual devices. Such applications have brought with them an increasing demand for bandwidth. As a result, equipment vendors race to build larger devices with significant processing capabilities. Consequently, a network may include different types of devices, such as switches and client devices. Even though these devices may belong to the same administrative domain, the devices may be distributed across multiple sites. In particular, network virtualization can allow devices from different sites to communicate with each other via a distributed local network, such as a virtual local area network (VLAN).

When one or more devices of the network are updated (e.g., due to a firmware update), the network may incur an issue. For example, due to a VLAN misconfiguration, data exchange between two switches may stop. To address such an issue, the updated network instance can be compared with a stable instance of the network. However, network management applications often do not support efficiently comparing network changes spanning a period. In particular, comparing the topology, states, and configuration of the network at different time instances can be challenging in a complex and distributed network.

The aspects described herein address the problem of efficiently comparing the topology, states, and configuration of a network at different time instances by (i) representing the network as a network image (NI) graph where the entities and relationships in the network are represented as vertices and edges, respectively; (ii) maintaining a timestamp pair for a respective edge to indicate an active period for the edge; and (iii) traversing the NI graph via the active edges at a time instance to determine the topology, states, and configuration of the network at the time instance. When an issue in the network is detected or if a comparison is desired, the topology, states, and configuration of the network can be efficiently determined for respective time instances when the network is stable and when the issue has incurred. By generating a graph difference between the corresponding NI graph instances at the time instances, the changes in the network can be detected efficiently.

With existing technologies, if a network management system, such as a network orchestrator, detects an issue (e.g., a malfunction) in the network, the system needs to determine the cause of the issue. The issue is often caused by a change (e.g., a software upgrade or the presence of a new device) in the network. If the system detects the issue after the change in the network, the system may need to identify the cause of the issue. In a distributed network spanning multiple sites, determining why and how the change has caused the issue can be challenging. Typically, if the network starts to malfunction, a configuration set (or configuration "dump") of a stable deployment of the network can be compared with another configuration set of the current deployment. Each configuration set can include a complete set of configurations applied on a respective switch in the network.

However, the system may not support efficiently comparing topology, states, and configuration of the network at different time instances. For example, the configuration set of a stable deployment may not be available for comparison. Furthermore, this process requires the network to maintain the configuration set of the most recent stable deployment.

A network tool may capture the snapshot or image of the network's states associated with individual devices. The snapshot can include the services running on the network at a particular time instance. The tool can compare snapshots and determine the changes for the device.

Furthermore, such an approach may require obtaining and maintaining periodic snapshots (i.e., at a certain time interval). Maintaining such a large volume of information can be inefficient. Furthermore, the tool may not support determining network-wide changes. As a result, even if a tool can compare configurations of individual devices, using these tools to compare the topology, states, and configuration of a network can be cumbersome and error prone.

To address this problem, the network management system can include a network management system (NMS) that can represent the network as an NI graph. The entities of the network can be the vertices of the NI graph and the respective relationships among the entities can be the corresponding edges. For example, a site and devices at a site can be represented by respective vertices. The site vertex can then be connected to the device vertices via respective edges. The edges can then indicate that the devices are deployed at the site.

A respective vertex can be associated with a set of attributes indicating the configuration of the entity represented by the vertex. Furthermore, the NMS can maintain, for each edge, two timestamps indicating when the edge is established (or created) and when it is expired. An edge is expired when the relationship associated with the edge is terminated. For existing edges, the expired timestamp can be a large value, such as "infinity." The created and expired timestamps indicate the active period for the edge. The NMS can then determine the network topology (e.g., physical and logical connections), states (e.g., parameters indicating device health, bandwidth, memory, and processing utilization on devices, etc.), and configuration (e.g., parameters defined for protocols and services) at a given time instance by traversing the active edges of the NI graph. Any active edge, which is created and unexpired, at the time instance can be included in the traversal.

Consequently, if an issue, such as a client experiencing performance degradation, is detected (e.g., loss of connection or roaming issues), the NMS can determine a set of vertices by traversing the NI graph at a time instance when the network is stable. The traversal can continue until a predetermine depth threshold is reached. Here, the traversal of the NI graph can include, starting from a preselected initial vertex, exploring vertices via corresponding active edges. The depth threshold can indicate how many successive edges can be explored from the initial vertex. If the traversal is proactive, which may not be associated with a particular issue, the initial vertex for the traversal can be a high-level vertex, such as a site-representing vertex. The traversal can then be a top-down traversal. On the other hand, if the traversal is reactive, which may be in response to a particular issue, the initial vertex can be representative of a client or a device. The traversal can then be a bottom-up traversal. The NMS can then determine another set of vertices at a time instance when the issue is detected. Since the vertices can represent the configuration of the network based on the corresponding attributes, the NMS can efficiently determine the changes in the network by comparing the two sets of vertices. Hence, the NMS can support efficient troubleshooting in the network by efficiently comparing network configuration, states, and topology at different time instances.

Furthermore, the NMS can represent the NI graph as an auxiliary graph to efficiently represent the changes in the NI graph. For example, if a site is updated, the NI graph needs to replace the vertex representing the site with a new vertex, which can cause regeneration of the edges that couple the vertices representing the devices of the site. To efficiently represent this change, the respective vertex can be represented by three vertices in the auxiliary graph. One of these vertices can be the main vertex representing the entity. The other two vertices can be auxiliary vertices associated with the main vertex.

The auxiliary vertices can include ingress and egress vertices coupling the main vertex. The egress vertex of the site can then be coupled to the respective ingress vertices of the devices. As a result, even if the main vertex of the site is updated, only the edges coupling the ingress and egress vertices are changed. In this way, changes to the NI graph can be efficiently captured using auxiliary graphs.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of an NMS representing a network using an NI graph, in accordance with an aspect of the present application. An NMS 130 (e.g., a network orchestrator) can manage a network 100. Network 100 can include a number of switches and devices, and may include heterogeneous network components, such as layer-2 and layer-3 hops and tunnels. In some examples, network 100 can be an Ethernet, InfiniBand, or other network, and may use a corresponding communication protocol, such as Internet Protocol (IP), FibreChannel over Ethernet (FCoE), or other protocol. Network 100 can span a plurality of sites 110 and 120. Hence, network 100 can be a multi-site distributed network. Site 110 can include switches 111, 113, 114, 116, and 118; and site 120 can include switches 122, 124, and 126. End devices (e.g., user devices) 132 and 134 can be coupled to switch 126. A respective switch in a respective site can be associated with a MAC address and an IP address.

In a respective site of network 100, switches can be coupled to each other via a link or a tunnel. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a site can be formed over an underlying network (or an underlay network). The underlying network can be a physical network, and a respective link of the underlying network can be a physical link. A respective switch pair in the underlying network can be a Border Gateway Protocol (BGP) peer.

Site 110 can include a virtual gateway switch (VGS) 112. Switches 111 and 113 can operate as a single switch in conjunction with each other to facilitate VGS 112. VGS 112 can be associated with one or more virtual addresses (e.g., a virtual IP address and/or a virtual MAC address). A respective data flow directed at VGS 112 can use the virtual address. To efficiently manage data forwarding, switches 111 and 113 can maintain an inter-switch link (ISL) between them for sharing control and/or data packets. The ISL can be a layer-2 or layer-3 connection that allows data forwarding between switches 111 and 113. Because the virtual address of VGS 112 is associated with both switches 113 and 113, other switches, such as switches 114, 116, and 118, of site 110 can consider VGS 112 as a single switch instead of switches 111 and 113.

With existing technologies, if NMS 130 detects an issue (e.g., a malfunction) in network 100, NMS 130 needs to determine the cause of the issue. The issue is often caused by a change in network 100. For example, if the firmware of a switch, such as switch 122, is upgraded, a change in network 100 has occurred. If the issue is detected after the change, the cause of the issue can be related to the change. Since network 100 is a distributed network spanning multiple sites, determining the impact of the change on the issue can be challenging. In particular, if an error occurs in network 100, such as a VLAN conflict, the changed instance of network 100 can be compared with a stable instance of network 100.

However, such a comparison may require maintaining a snapshot or image, which can include a configuration dump, of the stable instance of network 100. Maintaining such a large volume of information for network 100 can be inefficient. Furthermore, network 100 can deploy one or more network tools capable of capturing the snapshot or image of individual devices of network 100. These tools can compare snapshots and determine the changes for the device. These tools may not support determining changes across network 100. As a result, the comparison process may need to be repeated for all devices in network 100. Consequently, using these tools to compare the topology, states, and configuration of network 100 can be cumbersome and error prone.

To address this problem, network 100 can enhance NMS 130, which can be accessible via a wide-area network (WAN), such as an enterprise network or the Internet. For example, NMS 130 can run on a cloud server. During operation, NMS 130 can obtain network topology, states, and configuration information and represent network 100 as an NI graph 150. The entities of network 100 can be the vertices of NI graph 150 and the respective relationships among the entities can be the corresponding edges. The respective networks of sites 110 and 120 can be represented by sub graphs 160 and 170, respectively, of NI graph 150. A vertex 152 of NI graph 150 can represent network 100 and can connect sub graphs 160 and 170 in NI graph 150.

Sites 110 and 120 can be represented by vertices 172 and 162, respectively, in NI graph 150. Here, vertices 162 and 172 can be in sub graphs 160 and 170, respectively. Switches 111, 113, 114, 116, and 118 can be represented by vertices 182, 184, 174, 176, and 178, respectively, in sub graph 170. VGS 112 can be represented by vertex 180. Because switches 111 and 113 form VGS 112, vertices 182 and 184 can be coupled to vertex 180. Furthermore, vertices 180, 174, 176, and 178 can be coupled to vertex 172 via corresponding edges. These edges can then indicate that the corresponding switches are deployed at site 110. On the other hand, switches 122, 124, and 126 can be represented by vertices 164, 166, and 168, respectively, in sub graph 160. End devices 132 and 134 can be represented by vertices 192 and 194. Because end devices 132 and 134 are coupled to switch 126, vertices 192 and 194 can be coupled to vertex 168. Vertices 164, 166, and 168 can be coupled to vertex 162.

A respective vertex can be associated with a set of attributes. For example, vertex 164 can be associated with a set of attributes 146 indicating the configuration of switch 122, which is represented by vertex 164. Therefore, attributes 146 can correspond to the configuration parameters of switch 122. One of attributes 146 can be a unique identifier 148 that can uniquely identify vertex 164 in NI graph 150. Furthermore, NMS 130 can maintain, for each edge, two timestamps indicating when the edge is established or created and when it is expired. In this example, edge 140 between vertices 162 and 164 can be associated with timestamps e.created t and e.expired 144. Here, e.created 142 and e.expired 144 can indicate when edge 140 is created and expired, respectively. The timestamp value can be represented by a timestamp variable supported by an underlying development model (e.g., a timestamp variable of a programming language). Therefore, the period within timestamps e.created 142 and e.expired 144 can indicate the duration of edge 140 being active.

While switch 122 remains in site 120, the relationship between vertices 162 and 164 can remain active. Consequently, edge 140 can also remain active, thereby indicating the relationship. During the active period of edge 140, e.expired 144 can include a large value N, such as "infinity" (e.g., allocated based on infinity function supported by the underlying development model). In this way, e.created 142 and e.expired 144 can indicate the active period for edge 140. NMS 130 can then determine the topology, states, and configuration of network 100 at a given time instance by traversing the active edges of NI graph 150. Any active edge (i.e., created and unexpired) at the time instance can be included in the traversal. The traversal can be a top-down traversal from a vertex representing a high-level entity (e.g., a site) or a bottom-up traversal from a vertex representing a client-level entity (e.g., a device). The traversal can continue until a predetermine depth threshold is reached. Consequently, if an issue is detected in network 100, NMS 130 can determine a set of vertices by traversing NI graph 150 at a time instance, $t_1$, when network 100 is stable. NMS 130 can then determine another set of vertices at a time instance, $t_2$, when the issue is detected.

Since the vertices can represent the configuration of network 100 based on the corresponding attributes, NMS 130 can efficiently determine the changes in network 100 by comparing the respective sets of vertices determined for time instances $t_1$ and $t_2$. For example, if time instances $t_1$ and $t_2$ fall within e.created 142 and e.expired 144, edge 140 can be included in the respective traversals at time instances $t_1$ and $t_2$. Accordingly, vertex 164 can be included in both traversals. NMS 130 can then use attributes 146 to determine the configuration of switch 122 at time instances $t_1$ and $t_2$ and compare them to determine whether any change has occurred at time instance $t_2$. In this way, NMS 130 can support efficient troubleshooting in network 100 by efficiently comparing network configuration, states, and topology at different time instances.

Figure 2A:
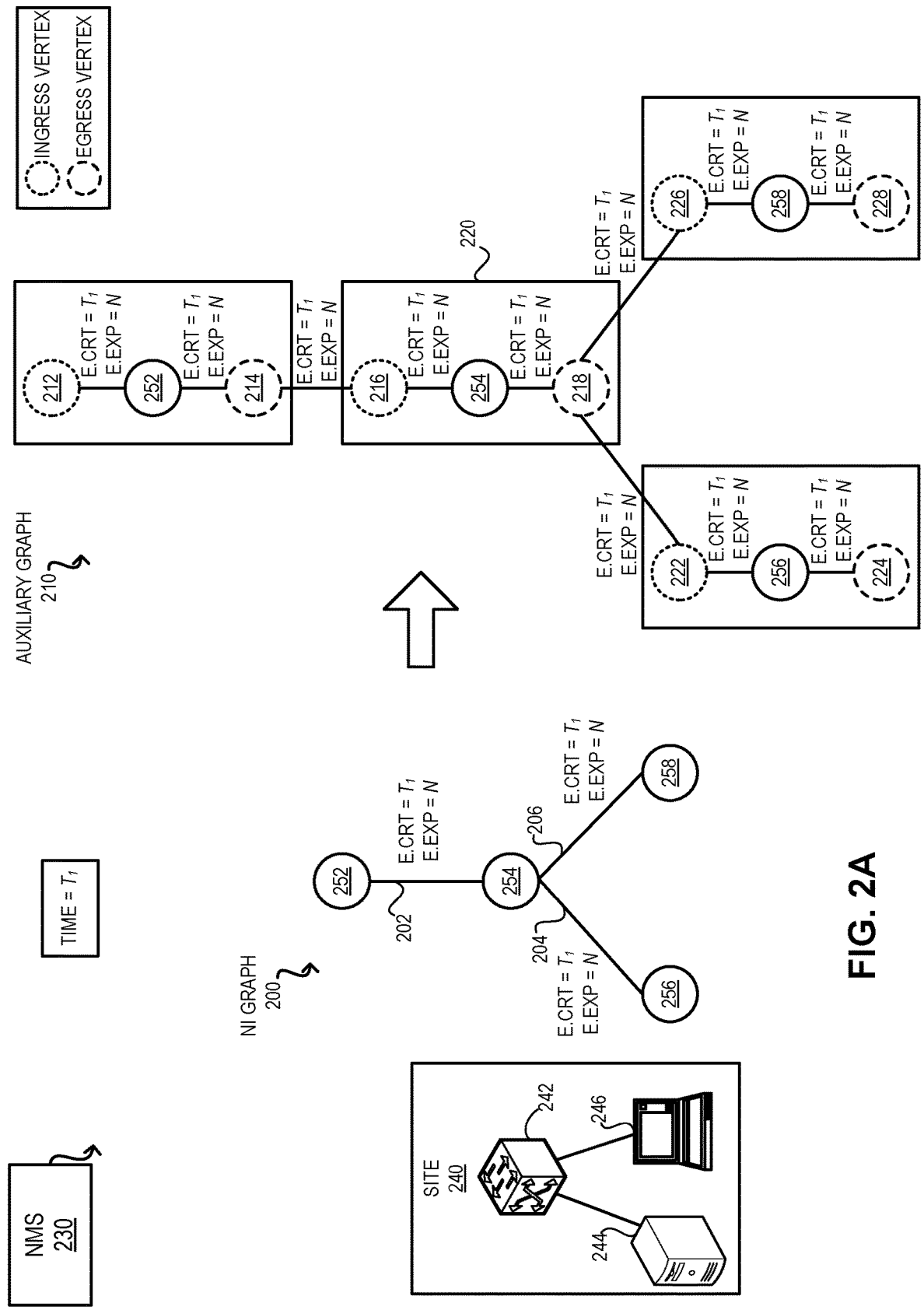
FIG. 2A illustrates an example of enhancing an NI graph using an auxiliary graph, in accordance with an aspect of the present application.

Furthermore, NMS 130 can represent NI graph 150 as an auxiliary graph to efficiently represent the changes in NI graph 150. FIG. 2A illustrates an example of enhancing an NI graph using an auxiliary graph, in accordance with an aspect of the present application. An NMS 230 can generate an NI graph 200 representing a site 240 that includes switch 242 and end devices 244 and 246. Graph 200 can include vertices 252, 254, 256, and 258 corresponding to site 240, switch 242, and end devices 244 and 246, respectively. Vertices 252 and 254 can have an edge 202 between them. Similarly, vertex 254 can be coupled to vertices 256 and 258 via edges 204 and 206, respectively. If edges 202, 204, and 206 are created at time instance $t_1$, the e.created and e.expired values for each of these edges can be $t_1$ and N, respectively. Without the auxiliary graph, if switch 242 is updated, NMS 230 needs to replace vertex 254 with a new vertex, which can cause regeneration of the edges that couple vertex 254.

To efficiently represent this change, a respective vertex in graph 200 can be represented by three vertices in auxiliary graph 210. Since graph 210 is an auxiliary representation of graph 200, graph 210 can also be considered as an NI graph. In this example, vertex 254 can be represented by a vertex set 220 in graph 210. Vertex set 220 can include vertex 254 as well as auxiliary vertices associated with vertex 254. The auxiliary vertices can include ingress vertex 216 and egress 218 coupling vertex 254. All incoming edges to vertex 254 can be coupled to ingress vertex 216; and all outgoing incoming edges from vertex 254 can be coupled to egress vertex 218. Similarly, vertex 252 can be coupled to ingress and egress vertices 212 and 214; vertex 256 can be coupled to ingress and egress vertices 222 and 224; and vertex 258 can be coupled to ingress and egress vertices 226 and 228.

Instead of coupling vertex 252 to vertex 254, egress vertex 214 of vertex 252 can be coupled to ingress vertex 216 of vertex 254. Similarly, egress vertex 218 of vertex 254 can be coupled to ingress vertices 222 and 226 of vertices 256 and 258, respectively. Here, If the edges of graph 210 are created at time instance $t_1$, the e.created and e.expired values for each of these edges can be $t_1$ and N, respectively. In graph 210, unlike edges directly coupling main vertices that represent entities, such as edge 202 of graph 200, main vertices 252, 254, 256, and 258 do not couple each other. Instead, the respective connections among the main vertices in graph 210 are established via corresponding egress and ingress vertices. These egress and ingress vertices can remain persistent while the main vertices can expire and be replaced by new vertices.

Figure 2B:
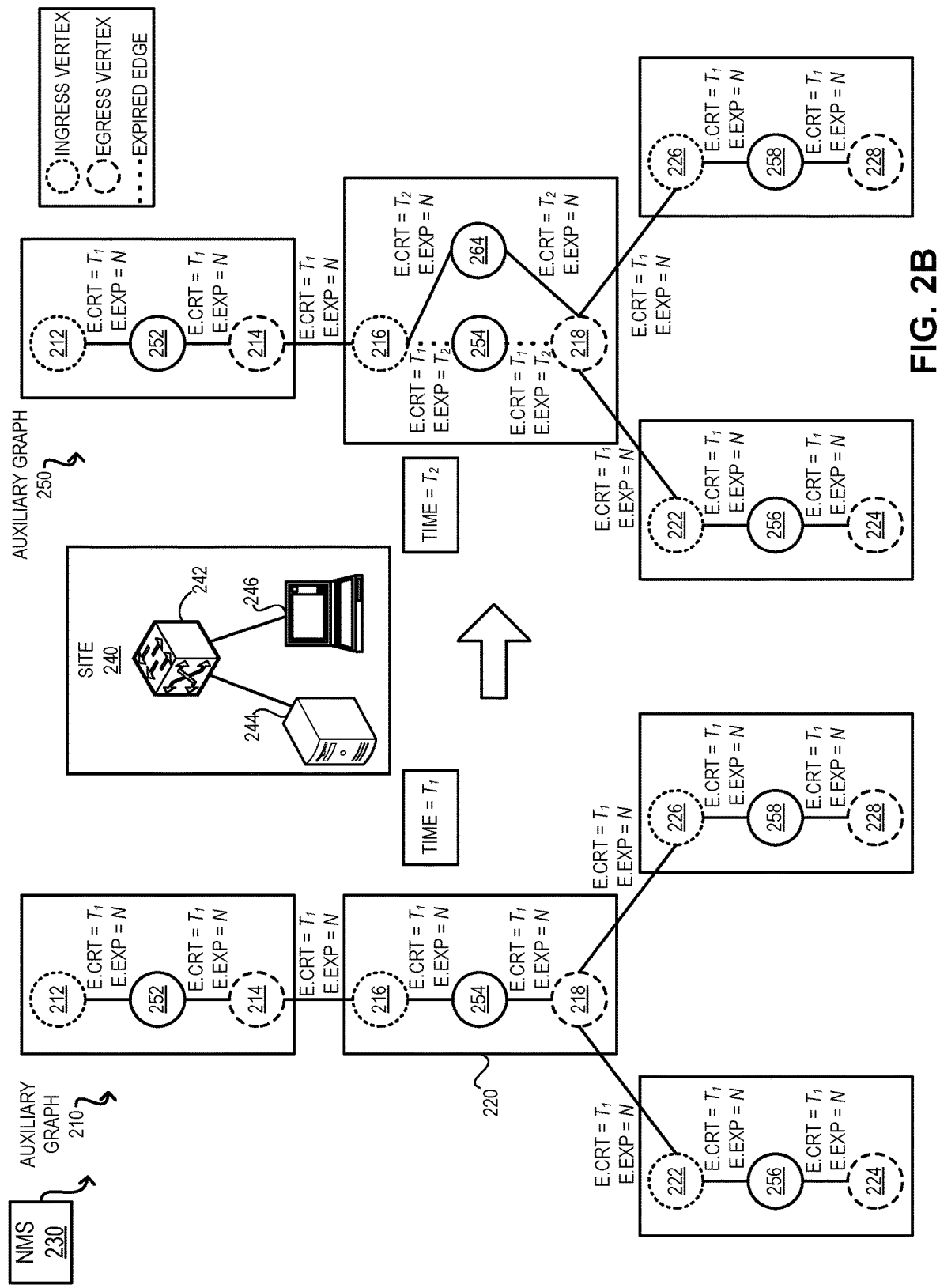
FIG. 2B illustrates an example of incorporating a change into an NI graph using an auxiliary graph, in accordance with an aspect of the present application.

FIG. 2B illustrates an example of incorporating a change into an NI graph using an auxiliary graph, in accordance with an aspect of the present application. Suppose that, at time instance $t_2$, switch 242 is updated (e.g., a new firmware is installed). Accordingly, the attributes associated with vertex 254 can be changed or modified. The changes to the attributes can include, but are not limited to, the presence of a new attribute, the removal or absence of an existing attribute, and an update to an attribute. Upon receiving the updated information from the network management system, NMS 230 can generate a new vertex 264 with the changed attributes for representing the updated switch 242. Since previous vertex 254 is no longer valid, the edges coupling ingress vertex 216 and egress vertex 218 to vertex 254 can expire at time instance $t_2$. Accordingly, e.expired values for these edges can be $t_2$. Therefore, these vertices remain active for a duration within time instances $t_1$ and $t_2$.

NMS 230 can also couple vertex 264 with ingress vertex 216 and egress vertex 218 with corresponding edges. The e.created and e.expired values for each of these edges can be $t_2$ and N, respectively. The e.created and e.expired values for the incoming edges to ingress vertex 216 and outgoing edges to edges vertex 218 can remain $t_1$ and N, respectively. Because of the use of ingress and egress vertices 216 and 218, NMS 230 does not need to remove edges from vertex 254 to vertices 252, 256, and 258; and establish new edges to vertex 264. As a result, even when a main vertex 254 is replaced by a new vertex 264, only the edges coupling the ingress and egress vertices are changed. In this way, changes in network 100 can be efficiently captured using auxiliary graphs 210 and 250.

Figure 3A:
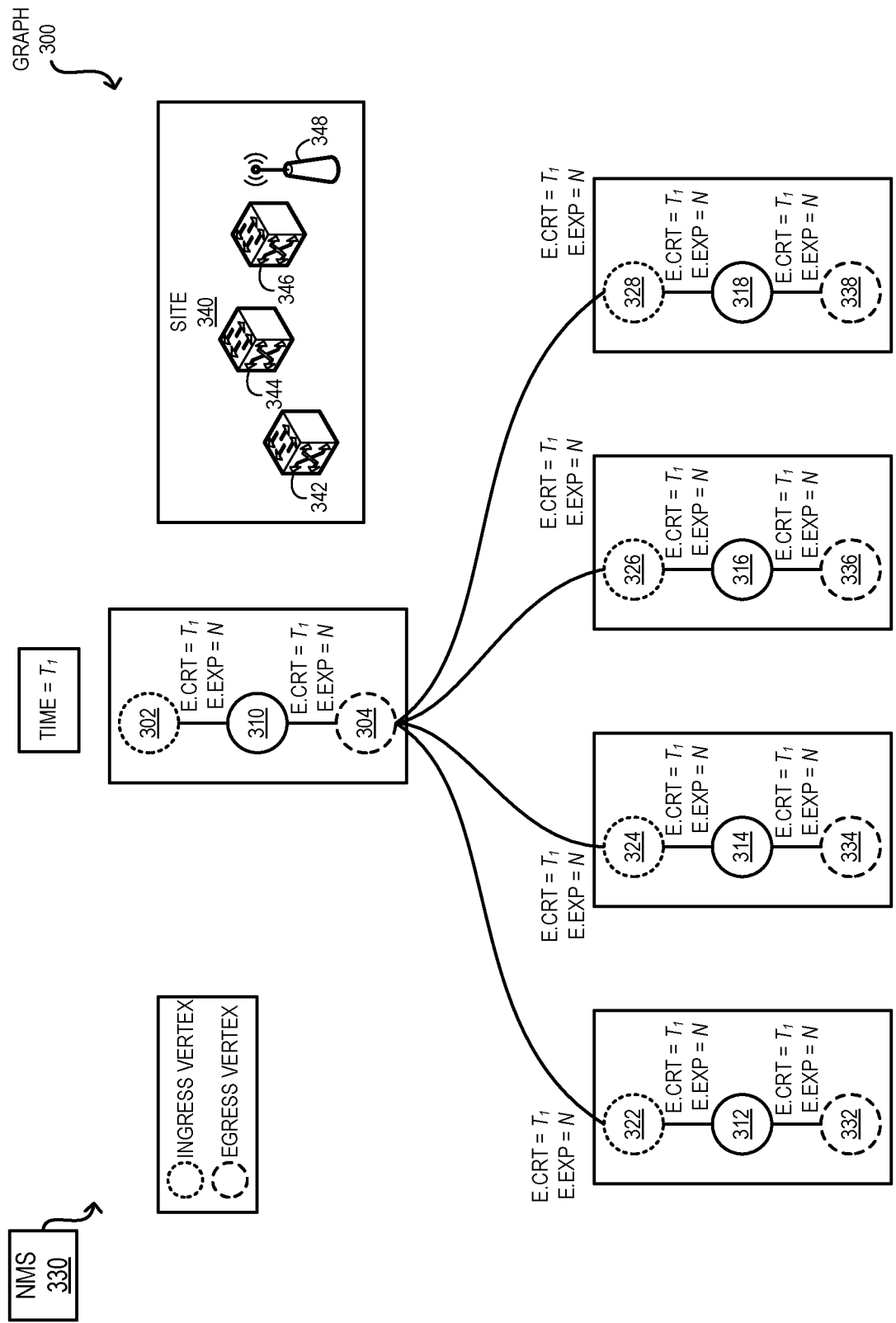
FIG. 3A illustrates an example of an NI graph representing a network at a time instance, in accordance with an aspect of the present application.

FIG. 3A illustrates an example of an NI graph representing a network at a time instance, in accordance with an aspect of the present application. During operation, an NMS 330 can generate an NI graph 300 representing a site 240 of a network at time instance $t_1$. Site 340 can include a set of devices 342, 344, 346, and 348. Graph 300 can be a graph $G=(V,E)$. Here, V can include main vertices that can represent the entities and their auxiliary vertices. The entities can include site 340 and devices 342, 344, 346, and 348. On the other hand, E can include a set of edges indicating the corresponding relationship among the vertices. Graph 300 can include vertex 310 representing site 340 and vertices 312, 314, 316, and 318 representing devices 342, 344, 346, and 348, respectively. Auxiliary vertices of vertex 310 can include ingress vertex 302 and egress vertex 304. Similarly, for vertices 312, 314, 316, and 318, ingress vertices can be vertices 322, 324, 326, and 328, respectively, and egress vertices can be vertices 332, 334, 336, and 338, respectively.

The e.created and e.expired values for each of the edges in graph 300 can be $t_1$ and N, respectively. Furthermore, a respective main vertex can be associated with a set of attributes. For example, vertex 312 can be associated with a set of attributes that corresponds to the configuration parameters of device 342. One of the attributes can include a unique identifier that can distinctly identify vertex 312 in graph 300. Another attribute can indicate whether a vertex is a main vertex or an auxiliary vertex. NMS 330 can maintain a graph data structure (e.g., a multi-dimensional array or linked list) in the memory of a computer system to maintain information associated with graph 300. A respective edge of graph 300 can be represented by an edge data structure in the graph data structure. The edge data structure can variables indicating the e.created and e.expired values for the corresponding edge.

Furthermore, a respective vertex can be represented by a vertex data structure in the graph data structure. The vertex data structure can include a set of variables representing the set of attributes associated with the vertex. These variables can then store the configuration parameters of the corresponding entity. One of the variables can store the unique identifier of the vertex. NMS 330 can store the graph data structure in a persistent storage device to ensure that the information represented in graph 300 is maintained during a power cycle (e.g., due to unexpected or predetermined unavailability) of the computer system. As a result, NMS 130 may not need to regenerate graph 300 in such an event.

A user may instruct NMS 330 to perform a graph traversal for a time instance. When NMS 330 performs the graph traversal (e.g., a breadth-first or depth-first traversal up to a predetermined depth) graph 300, NMS 330 can obtain the unique identifier of a starting vertex and start the traversal from the starting vertex. If an administrator wants to determine how site 340 is operating at a time instance, NMS 330 may use the breadth-first traversal to determine network topology, states, and configuration at individual levels. On the other hand, to explore how a particular device or set of devices are operating at the time instance, NMS 330 may use the depth-first traversal. In this example, the starting vertex can be vertex 302. Even though a traversal of graph 300 can include the auxiliary vertices, the traversal can only incorporate the main vertices. In other words, NMS 330 can distinguish between the main and auxiliary vertices of graph 300 and exclude the auxiliary vertices from the traversal accordingly. As a result, if NMS 330 traverses graph 300 for a time instance between $t_1$ and N, vertices 310, 312, 314, 316, and 318 can be included in the traversal.

Figure 3B:
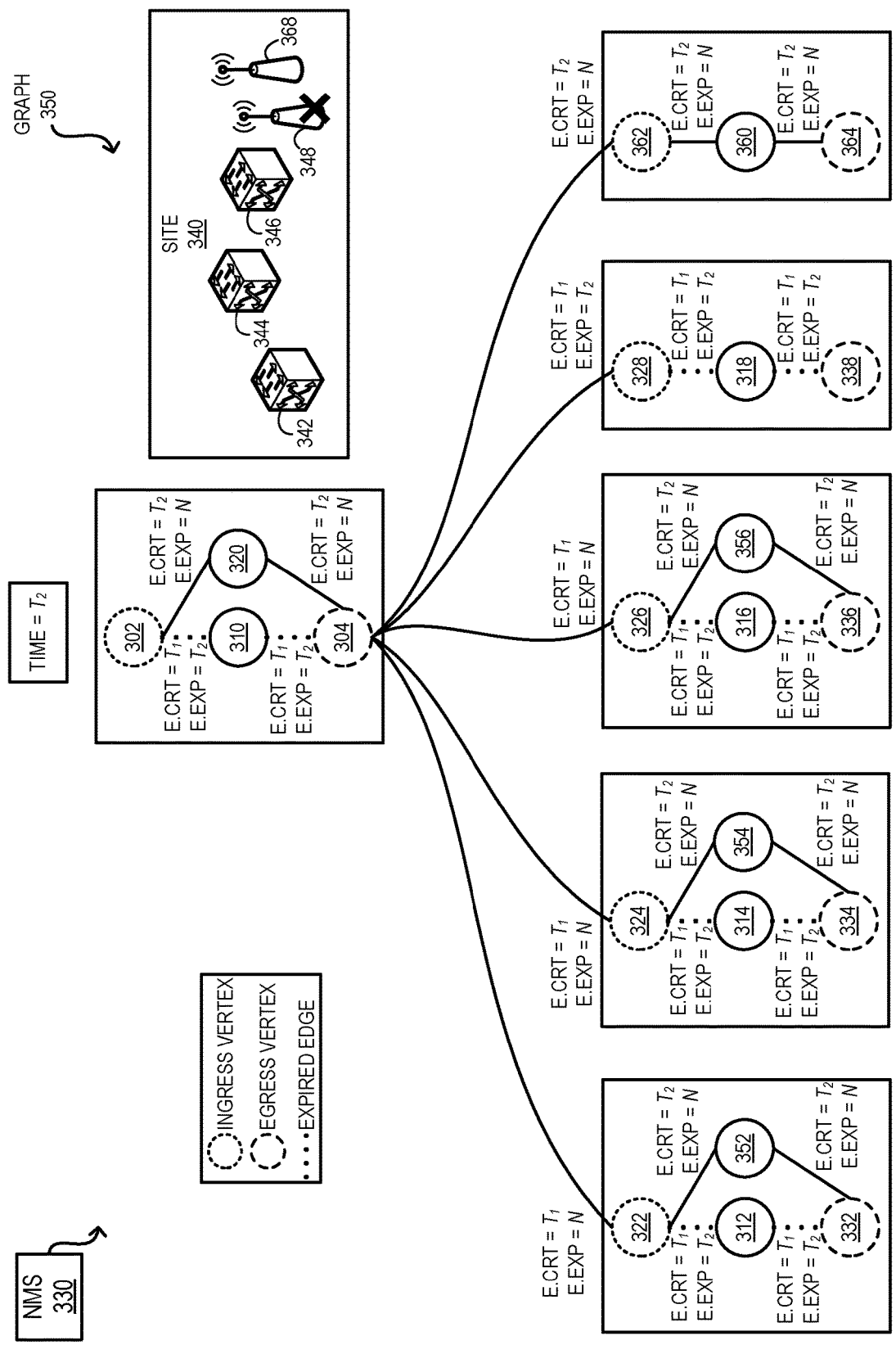
FIG. 3B illustrates an example of an NI graph representing a changed network at another time instance, in accordance with an aspect of the present application.

FIG. 3B illustrates an example of an NI graph representing a changed network at another time instance, in accordance with an aspect of the present application. If the network is changed at time instance $t_2$, NMS 330 can obtain the information indicating the changes from the network management system and update graph 300 to generate an updated NI graph 350. The changes can include changes to site 340. Accordingly, NMS 330 can generate a new vertex 320 that incorporates the changes to site 340, thereby generating a new graph 350. Since previous vertex 310 is no longer valid, the edges coupling ingress vertex 302 and egress vertex 304 to vertex 310 can expire at time instance $t_2$. Accordingly, e.expired values for these edges can be $t_2$. Therefore, these vertices remain active for a duration within time instances $t_1$ and $t_2$. NMS 330 can also couple vertex 320 with ingress vertex 302 and egress vertex 304 to vertex 264 with corresponding edges. The e.created and e.expired values for each of these edges can be $t_2$ and N, respectively.

There can be a number of other changes in site 340. For example, one or more attributes of device 342 can be removed, one or more attributes can be added to device 344, one or more attributes of device 346 can be updated, device 348 can be removed from site 340 (denoted with a cross), and a new device 368 can be added to site 340. Based on the changes, NMS 330 can generate new vertices 352, 354, and 356 representing the newer versions of devices 342, 344, and 346, respectively. Edges coupling auxiliary vertices of previous vertices 312, 314, and 316 can then expire. Accordingly, e.expired values for these edges can be $t_2$. New edges can then couple the respective auxiliary vertices to vertices 352, 354, and 356. The e.created and e.expired values for each of these edges can be $t_2$ and N, respectively.

Since device 348 is removed, the edges coupling the corresponding vertex 318 can expire at time instance $t_2$. Furthermore, the edge coupling ingress vertex 328 can also expire. Hence, e.expired values for these edges can be $t_2$. In addition, a new vertex 360 representing newly added device 368 can be added to graph 350. Vertex 360 can be coupled to ingress vertex 362 and egress vertex 364 via corresponding edges. Egress vertex 304 of vertex 320 can be coupled vertex 362 via a corresponding edge. The e.created and e.expired values for each of these edges can be $t_2$ and N, respectively. In this way, graph 350 can then represent site 340 at time instance $t_2$.

During operation, NMS 330 can receive an instruction to compare the topology, states, and configuration of site 340 at time instances $t_1$ and $t_2$. NMS 330 can present a user interface to a user to receive the instruction. Examples of the user interface can include, but are not limited to, a graphical user interface, a textual interface, a touch interface, a gesture-detecting interface, a virtual or augmented reality interface, and a movement-detecting interface. NMS 330 can then traverse graph 300 of FIG. 3A via the active edges at time instance $t_1$. NMS 330 can also traverse graph 350 of FIG. 3B via the active edges at time instance $t_2$. During a respective traversal, NMS 330 can present the attributes represented by a respective traversed vertex. Therefore, time instances $t_1$ and $t_2$ can be the target time instances for the respective traversals.

To initiate a respective traversal, NMS 330 can determine an initial or starting vertex based on the unique identifier associated with the vertex. The initial vertex can be the starting point for the traversal. If the traversal is proactive, which may not be associated with a particular issue, the initial vertex can be the ingress vertex 302 associated with vertices 310 and 320. The traversal can then be a top-down traversal to device-representing vertices. The sequence for the top-down traversal for a respective vertex set can be an ingress vertex, a main vertex, and an egress vertex. Since the initial vertex at time instance $t_2$ may have expired at time instance $t_2$, NMS 330 can determine the initial vertex for each time instance. For a top-down traversal of graph 350, the sequence of vertices explored by the traversal can be vertices 302, 320, 304, 322, 352, 332, 324, 354, 334, 326, 356, 336, 328, 318, 338, 362, 360, and 364.

On the other hand, if the traversal is reactive, which may be in response to a particular issue, the initial vertex can be a client-level vertex, such as a device-representing vertex (e.g., vertex 332, 334, 336, 338, or 364). The issue can be the experience at a client's site (e.g., the performance degradation at a network device). The traversal can then be a bottom-up traversal. The sequence for the bottom-up traversal for a respective vertex set can be an egress vertex, a main vertex, and an ingress vertex. Consequently, the bottom-up traversal can gradually traverse up to a vertex representing a large entity (e.g., a site). For a bottom-up traversal of graph 350 starting from vertex 336, the sequence of vertices explored by the traversal can be vertices 336, 356, 326, 304, 320, and 302. Based on the traversals, NMS 330 can determine corresponding sets of vertices reachable via active vertices at time instances $t_1$ and $t_2$. NMS 330 can identify the vertices present in both sets of vertices and determine the differences of attributes for each of the identified vertices. The difference can include removed attributes, new attributes, and updated attributes.

For example, at time instances $t_1$, the traversal can explore vertices 312, 314, and 316 via corresponding active edges. On the other hand, at time instances $t_1$, the traversal can explore vertices 352, 354, and 356 via corresponding active edges. During the exploration, NMS 330 can present the attributes represented by a respective traversed or explored vertex in association with the corresponding entity via a user interface. By comparing vertices 312 and 352, NMS 330 can determine that an attribute indicated by vertex 312 is removed at vertex 352. Similarly, NMS 330 can determine that an attribute absent in vertex 314 is added to vertex 352, and an attribute is updated at vertex 356 with respect to vertex 316. NMS 330 can also compare the sets of vertices to identify removed vertex 318 and new vertex 360. In this way, NMS 330 can efficiently determine and compare the configuration, states, and topology associated with site 340 at time instances $t_1$ and $t_2$.

Figure 4A:
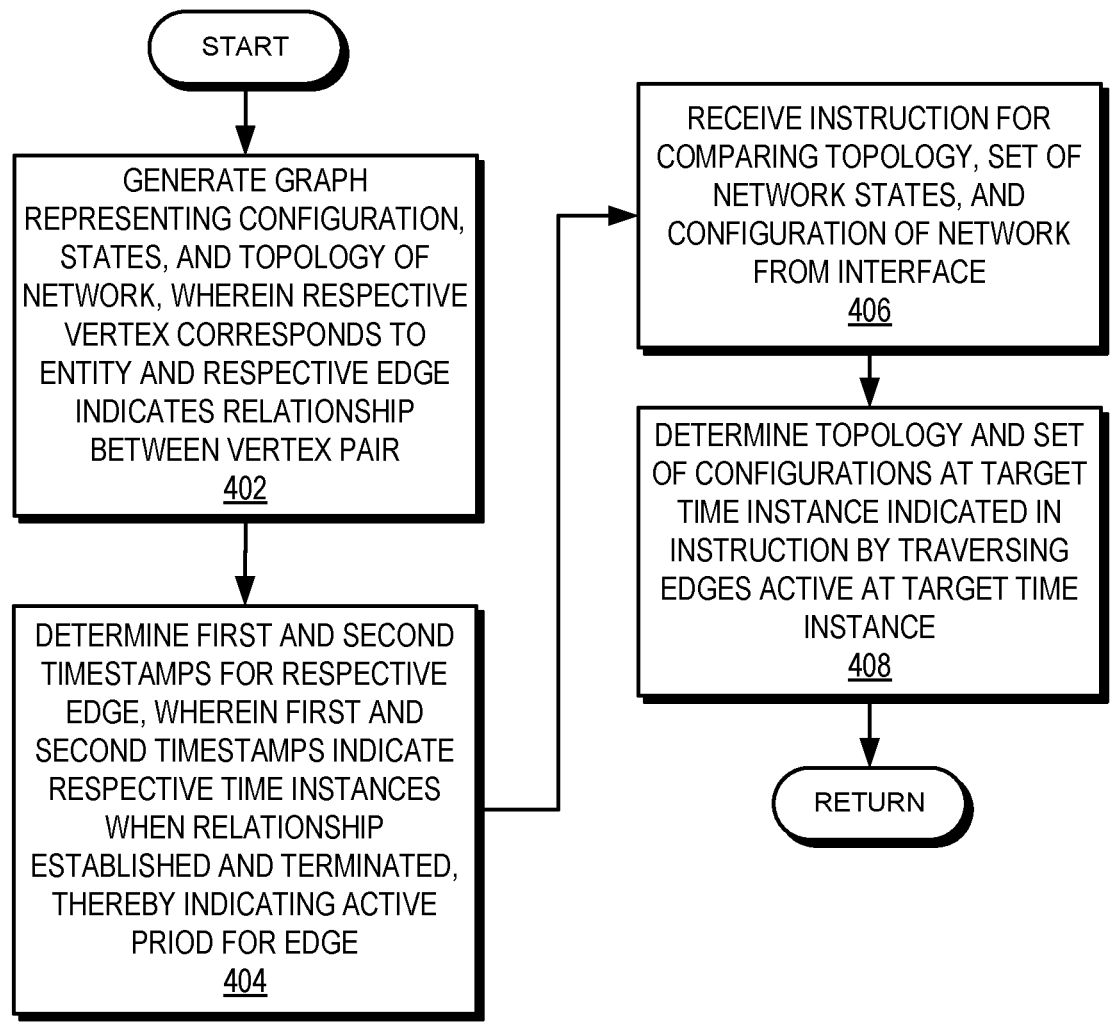
FIG. 4A presents a flowchart illustrating an example of the process of an NMS determining topology, states, and configuration of a network at a target time instance, in accordance with an aspect of the present application.

FIG. 4A presents a flowchart illustrating an example of the process of an NMS determining topology, states, and configuration of a network at a target time instance, in accordance with an aspect of the present application. During operation, the NMS can generate a graph representing the configuration, states, and topology of a network, wherein a respective vertex corresponds to an entity, and a respective edge indicates a relationship between a vertex pair (operation 402). The NMS can obtain information associated with a respective entity of the network, such as a site and a device. The NMS can then represent the entity with a vertex of the graph. The NMS can then couple the vertex to other vertices that have a relationship with corresponding edges. The NMS can determine a first and a second timestamps for a respective edge, wherein the first and second timestamps indicate respective time instances when a relationship is established and terminated, thereby indicating an active period for the edge (operation 404). When the edge remains active, the second timestamp can have a large value, such as infinity, indicating that the corresponding relationship has not expired. The NMS can then receive an instruction for comparing the topology, states, and configuration of the network from the interface of the NMS (operation 406). Accordingly, the NMS can determine a topology, a set of network states, and a set of configurations of the network at a target time instance indicated in the instruction by traversing the edges active at the target time instance (operation 408). The graph traversal can start from a preselected initial vertex and explore a respective vertex reachable via an active edge from a traversed vertex.

Figure 4B:
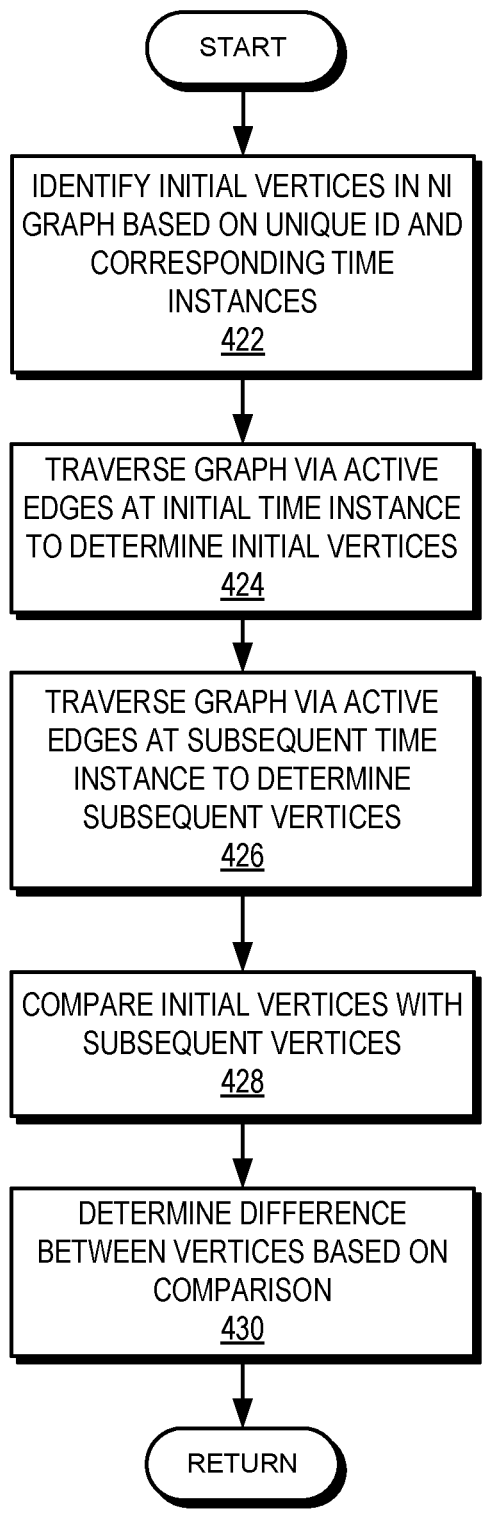
FIG. 4B presents a flowchart illustrating an example of the process of an NMS comparing respective NI graphs at different time instances, in accordance with an aspect of the present application.

FIG. 4B presents a flowchart illustrating an example of the process of an NMS comparing respective NI graphs at different time instances, in accordance with an aspect of the present application. During operation, the NMS can identify the initial vertices in an NI graph based on a unique identifier and corresponding time instances (operation 422). The NMS can present an interface via which the user can provide the unique identifier to the NMS. Examples of the interface can include, but are not limited to, a textual interface, a graphical user interface, a touch interface, and a gesture or motion interface. The NMS can then traverse the graph via the active edges at the initial time instance to determine initial vertices (operation 424). An edge can be active at a time instance if it falls between the created and expired timestamps. The traversal can then explore the vertices reachable via the edges at the time instance. The NMS can also traverse the graph via the active edges at the subsequent time instance to determine subsequent vertices (operation 426). The NMS can then compare the initial vertices with the subsequent vertices (operation 428) and determine the difference between vertices based on the comparison (operation 430). The comparison can include determining, for the same vertex, whether there is a new, removed, or updated attribute at the subsequent time instance with respect to the initial timestamp.

Figure 4C:
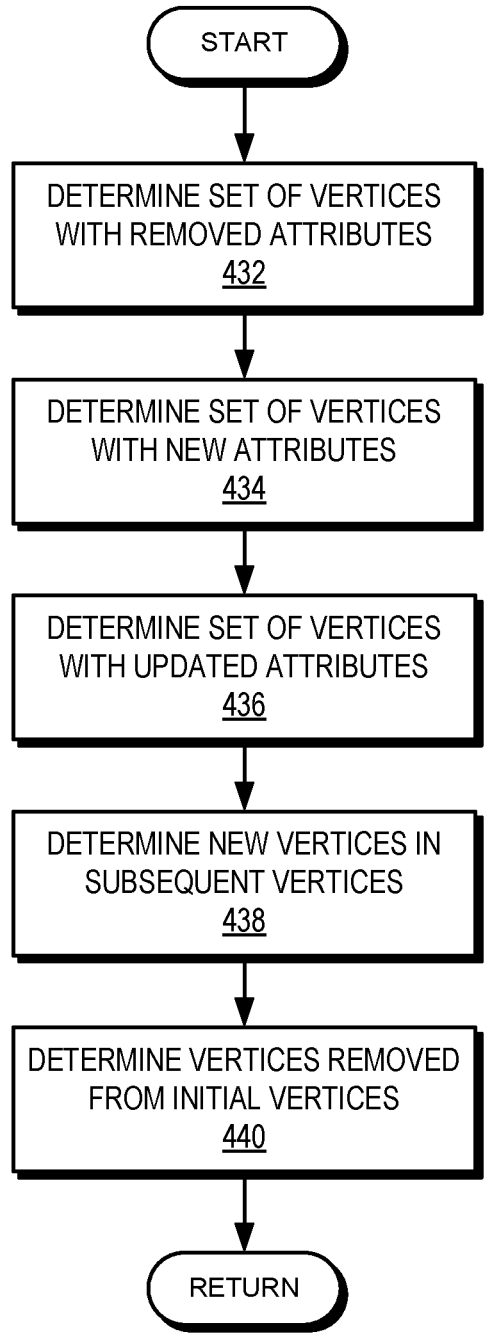
FIG. 4C presents a flowchart illustrating an example of the process of an NMS determining the difference between respective NI graphs at different time instances, in accordance with an aspect of the present application.

FIG. 4C presents a flowchart illustrating an example of the process of an NMS determining the difference between respective NI graphs at different time instances, in accordance with an aspect of the present application. During operation, the NMS can determine a set of vertices with removed attributes (operation 432) and a set of vertices with new attributes (operation 434). The NMS can also determine a set of vertices with updated attributes (operation 436). If the initial instance of a vertex includes an attribute that is missing in the subsequent instance, the vertex is added to the set of vertices with removed attributes. On the other hand, if the initial instance of a vertex does not include an attribute that is present in the subsequent instance, the vertex is added to the set of vertices with new attributes. Furthermore, if the initial instance of a vertex includes an attribute that is updated in the subsequent instance, the vertex is added to the set of vertices with updated attributes. Each of these sets of vertices can be present in different time instances. For each vertex, the attributes at the different time instances are compared with each other to determine the difference. Furthermore, the NMS can also determine new vertices in subsequent vertices (operation 438) and vertices removed from initial vertices (operation 440).

Figure 4D:
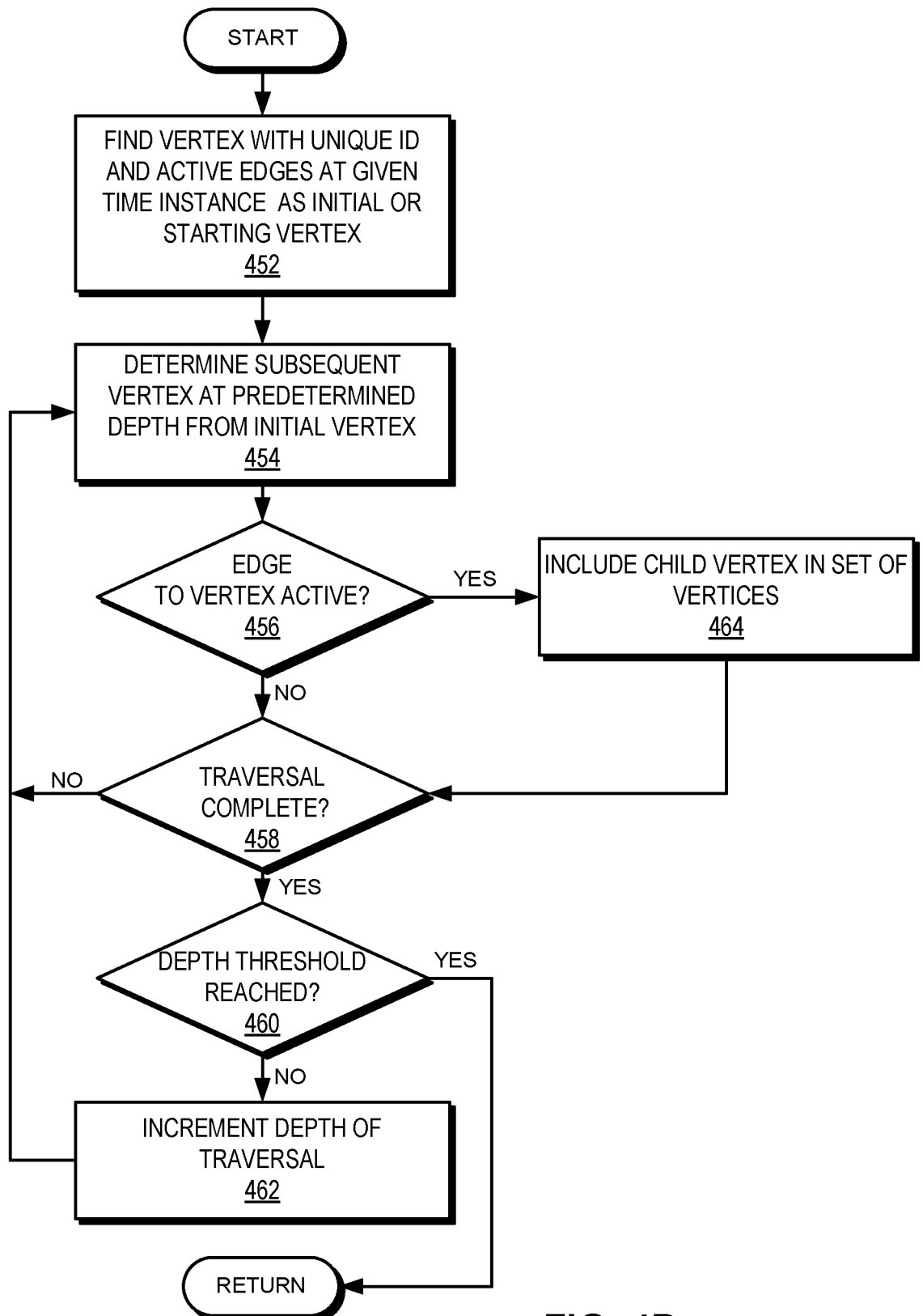
FIG. 4D presents a flowchart illustrating an example of the process of an NMS determining vertices of an NI graph at a time instance, in accordance with an aspect of the present application.

FIG. 4D presents a flowchart illustrating an example of the process of an NMS determining vertices of an NI graph at a time instance, in accordance with an aspect of the present application. During operation, the NMS can find the vertex with a unique identifier and active edges at a given time instance as the initial or starting vertex (operation 452). A user can provide an instruction to the NMS with the unique identifier and the time instance. The instruction can be received via an interface presented by the NMS. The NMS can then determine a subsequent vertex at a predetermined depth from the initial vertex (operation 454) and determine whether the edge to the subsequent vertex is active (operation 456). For example, if the depth is one, each of the subsequent vertices can be coupled to the initial vertex with one edge.

If the edge to the subsequent vertex is active, the NMS can include the subsequent vertex in the set of vertices (operation 464). On the other hand, if the edge to the subsequent vertex is not active, the NMS can determine whether the traversal is complete (operation 458). The traversal can be complete when all vertices up to a threshold depth (e.g., the maximum depth to be explored) are explored. If the traversal is complete, the NMS can determine whether a depth threshold is reached (operation 460). If the depth threshold is not reached, the NMS can increment the depth of the traversal (operation 462). However, if the traversal is not complete (operation 458) or upon incrementing the depth (operation 462), the NMS can continue to determine another subsequent vertex at the predetermined depth from the initial vertex (operation 454).

Figure 5A:
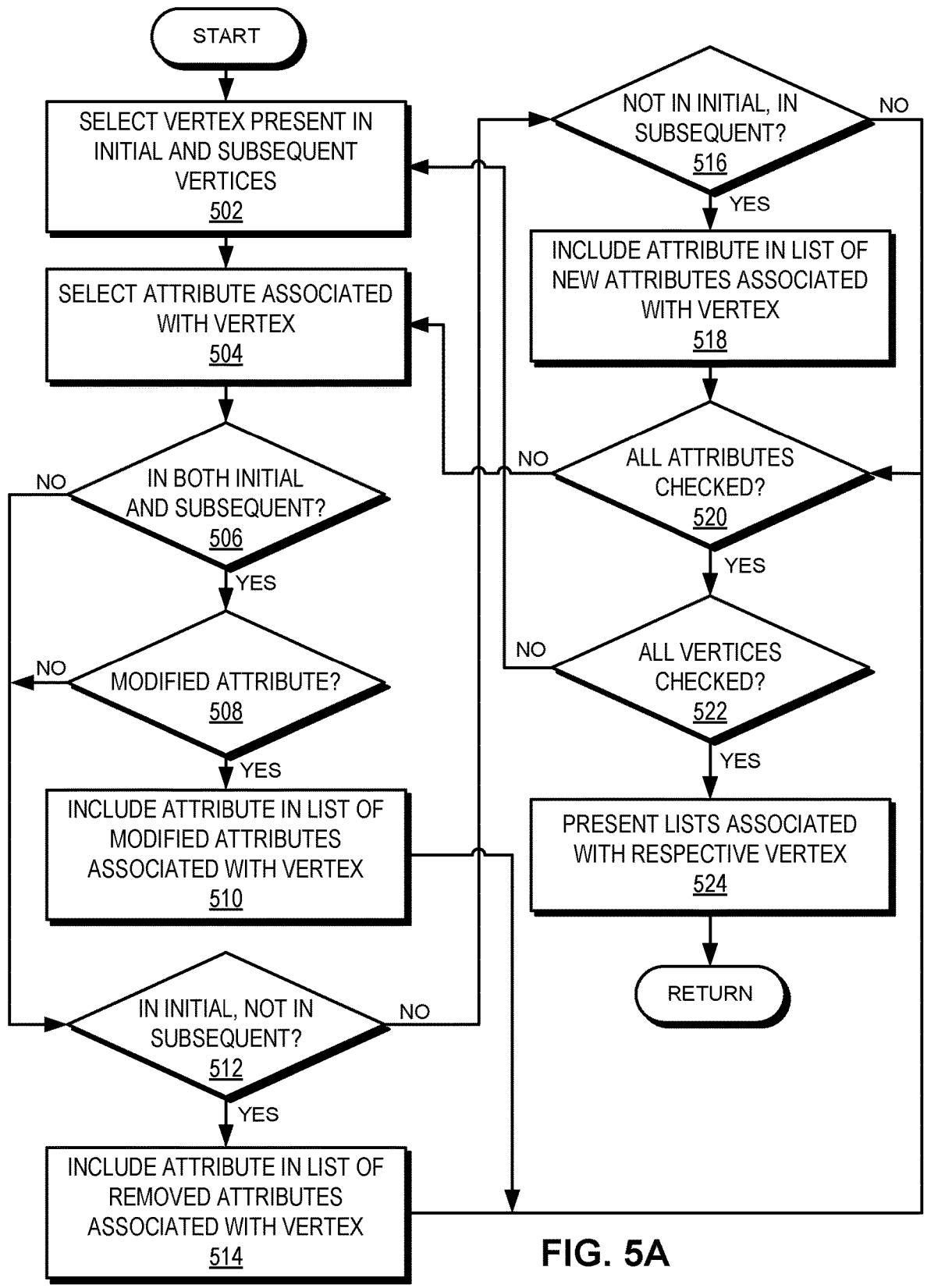
FIG. 5A presents a flowchart illustrating an example of the process of an NMS determining the difference of attributes between respective NI graphs at different time instances, in accordance with an aspect of the present application.

FIG. 5A presents a flowchart illustrating an example of the process of an NMS determining the difference of attributes between respective NI graphs at different time instances, in accordance with an aspect of the present application. During operation, the NMS can select a vertex present in the initial and subsequent vertices (operation 502) and select an attribute associated with the vertex (operation 504). The NMS can then perform a number of checks to determine the difference associated with the attribute. Accordingly, the NMS can determine whether the attribute is in both initial and subsequent vertices (operation 506). If the attribute is in both initial and subsequent vertices, the NMS can also determine whether the attribute is a modified attribute (operation 508). If the attribute is a modified attribute, the NMS can include the attribute in a list of modified attributes associated with the vertex (operation 510).

On the other hand, if the attribute is in both initial and subsequent vertices (operation 506) or not a modified attribute (operation 508), the NMS can determine whether the attribute is in the initial instance but not in the subsequent instance of the vertex (operation 512). If the attribute is in the initial instance but not in the subsequent instance of the vertex, the NMS can include the attribute in a list of removed attributes associated with the vertex (operation 514). Otherwise, the NMS can determine whether the attribute is not in the initial instance but in the subsequent instance of the vertex (operation 516). If the attribute is not in the initial instance but in the subsequent instance of the vertex, the NMS can include the attribute in a list of new attributes associated with the vertex (operation 518).

Upon performing the checks (operations 506, 508, 512, and 516) or including the attribute to a list (operation 510, 514, or 516), the NMS can determine whether all attributes associated with the vertex are checked (operation 520). If all attributes are not checked, the NMS can continue to select another attribute associated with the vertex (operation 504).

However, if all attributes are checked, the NMS can determine whether all vertices present in initial and subsequent vertices are checked (operation 522). If all vertices are not checked, the NMS can continue to select another vertex present in the initial and subsequent vertices (operation 502). If all vertices are checked, the NMS can present the lists associated with a respective vertex (operation 524).

Figure 5B:
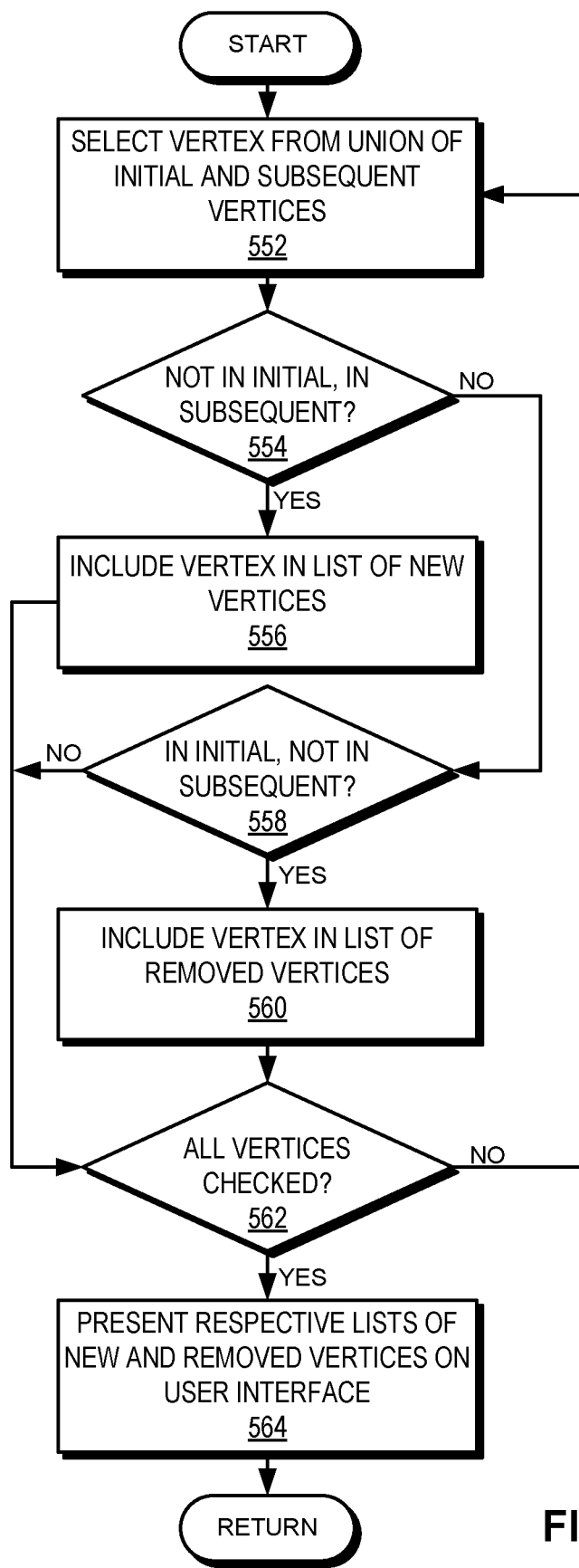
FIG. 5B presents a flowchart illustrating an example of the process of an NMS determining the difference of vertices between respective NI graphs at different time instances, in accordance with an aspect of the present application.

FIG. 5B presents a flowchart illustrating an example of the process of an NMS determining the difference of vertices between respective NI graphs at different time instances, in accordance with an aspect of the present application. During operation, the NMS can check for new and removed vertices. To do so, the NMS can select a vertex from a union of the initial and subsequent vertices (operation 552) and determine whether the vertex is not in the initial vertices but in the subsequent vertices (operation 554). If the vertex is not in the initial vertices but in the subsequent vertices, the NMS can include the vertex in a list of new vertices (operation 556). Otherwise, the NMS can determine whether the vertex is in the initial vertices but not in the subsequent vertices (operation 558).

If the vertex is in the initial vertices but not in the subsequent vertices, the NMS can include the vertex in a list of removed vertices (operation 560). Otherwise, the vertex can be present in both the initial and subsequent vertices. Upon performing the checks (operations 554 and 558) or including the vertex in a list (operation 556 or 562), the NMS can determine whether all vertices in the union are checked (operation 562). If all vertices are checked, the NMS can present the respective lists of new and removed vertices on a user interface of the NMS (operation 564).

Figure 6:
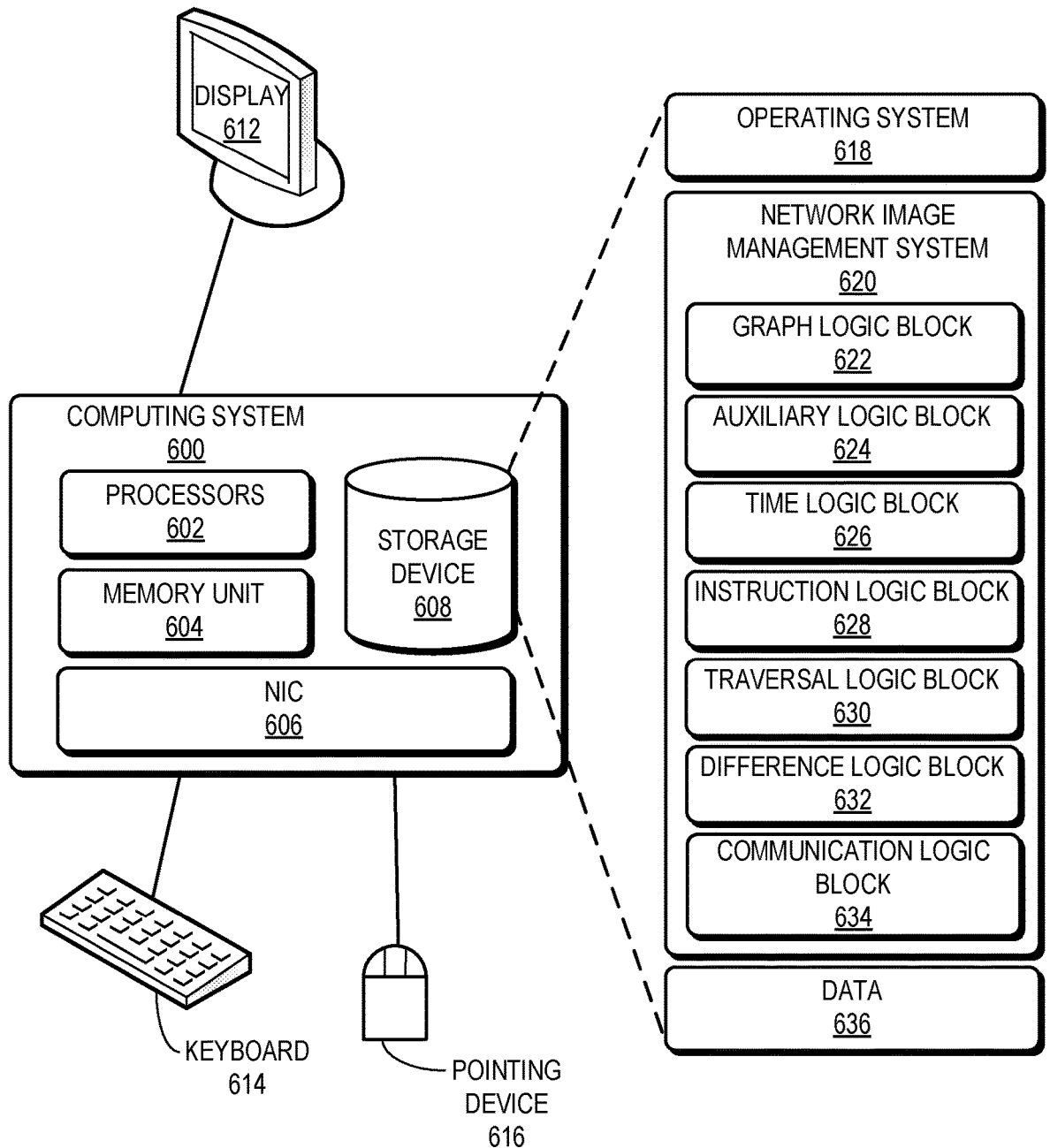
FIG. 6 illustrates an example of a computing system facilitating an NMS capable of comparing network topologies and configurations at different time instances, in accordance with an aspect of the present application.

FIG. 6 illustrates an example of a computing system facilitating an NMS capable of comparing network topologies and configurations at different time instances, in accordance with an aspect of the present application. A computing system 600 can include a set of processors 602, a memory unit 604, a network interface card (NIC) 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage device 608 can store an operating system 618, an NI management system 620, and data 636.

NI management system 620 can include instructions, which when executed by computing system 600, can cause computing system 600 to perform methods and/or processes described in this disclosure. Specifically, if computing system 600 is a sender device, NI management system 620 can include instructions for generating an NI graph representing a network (graph logic block 622). NI management system 620 can also include instructions for representing the NI graph as an auxiliary graph (auxiliary logic block 624). NI management system 620 can include instructions for determining and maintaining the created and expired timestamps for a respective edge of NI graph (time logic block 626).

NI management system 620 can include instructions for presenting a user interface (interface logic block 628). NI management system 620 can also include instructions for receiving an instruction for comparing the topology, states, and configuration of a network at two time instances (interface logic block 628). NI management system 620 may include further instructions for traversing the NI graph via the active edges at a time instance to determine a set of vertices (traversal logic block 630). Moreover, NI management system 620 can include instructions for determining the difference between two sets of vertices (difference logic block 632). The difference can include identifying new and removed vertices, and determining new, removed, and updated attributes of a respective vertex present in both sets of vertices.

NI management system 620 can also include instructions for sending and receiving packets based on respective destinations (communication logic block 634). Data 636 can include any data that can facilitate the operations of NI management system 620. Data 636 can include, but is not limited to, data structures representing the NI graph, initial vertex information, and output of graph traversals and graph difference.

Figure 7:
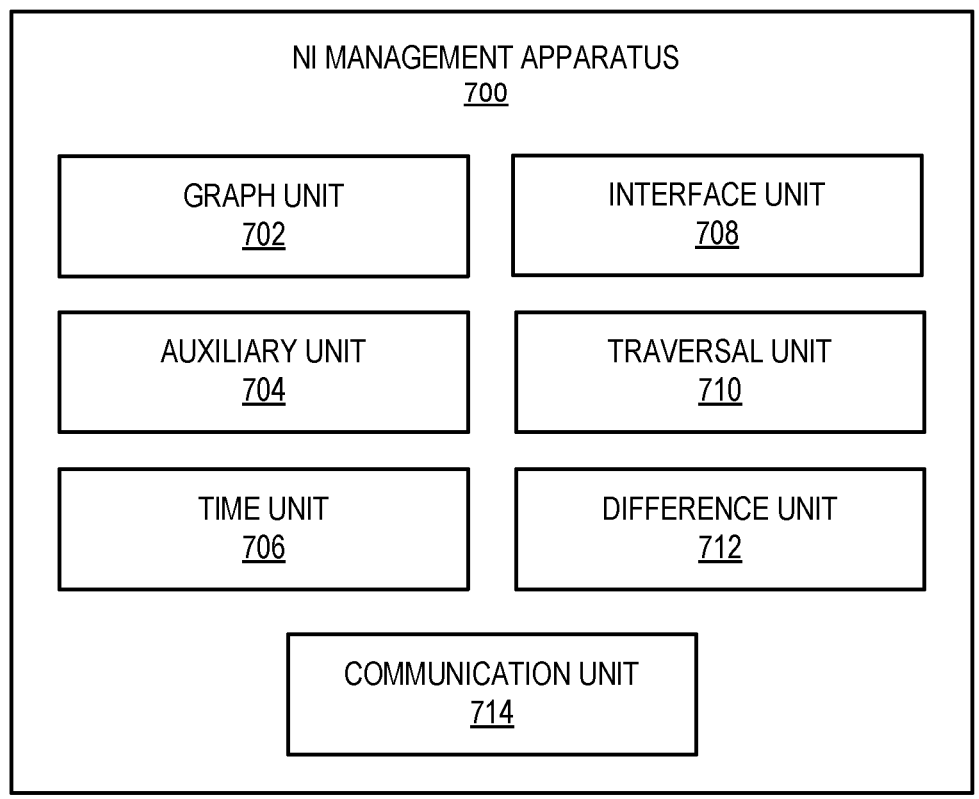
FIG. 7 illustrates an example of an apparatus that facilitates an NMS capable of comparing network topologies and configurations at different time instances, in accordance with an aspect of the present application.

FIG. 7 illustrates an example of an apparatus that facilitates an NMS capable of comparing network topologies and configurations at different time instances, in accordance with an aspect of the present application. NI management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated with a computer system, or realized as a specialized device. For example, apparatus 700 can be an accelerator in a computer system. Specifically, apparatus 700 can comprise units 702-714, which perform functions or operations similar to logic blocks 622-634 of NI management system 620 of FIG. 6, including: a graph unit 702; an auxiliary unit 704, a time unit 706; an interface unit 708; a traversal unit 710, a difference unit 712; and a communication unit 714.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network management system that can orchestrate a network. During operation, the system can generate a graph representing the configuration, states, and topology of the network. A respective vertex of the graph can correspond to an entity in the network, and a respective edge of the graph can indicate a relationship between a vertex pair. The system can determine a first timestamp and a second timestamp for a respective edge of the graph. The first timestamp indicates a time instance when a relationship indicated by the edge is established. The second timestamp indicates a time instance when the relationship indicated by the edge is terminated. Here, a time range between the first and second timestamps indicates an active period for the edge. The system can then receive, from an interface of the system, an instruction for comparing the topology, states, and configuration of the network. Accordingly, the system can determine, based on the instruction, a topology, a set of network states, and a set of configurations of the network at a target time instance indicated by the instruction by traversing edges of the graph, which are active at the target time instance.

In a variation on this aspect, upon determining a change in the network at a first time instance, the system can change an edge, which has been created at a previous time instance, in the graph.

In a further variation, if the changing of the edge includes the removal of the edge, the system can set the first time instance as the second timestamp for the edge. On the other hand, if the changing of the edge including the addition of the edge, the system can set the first time instance as the first timestamp for the edge. Here, a value greater than the first timestamp is set as the second timestamp for the edge.

In a further variation, the system can determine a set of vertices impacted by the change. The set of vertices can be associated with the same entity of the network. The set of vertices can include a primary vertex and a plurality of auxiliary vertices, and the edge can be coupled to an auxiliary vertex.

In a further variation, the system can change the edge by coupling the edge to a new primary vertex while the edge remains coupled to the auxiliary vertex.

In a further variation, the system can determine, at the first time instance, one or more of: a missing attribute, a new attribute, a change attribute, a new vertex, and a missing vertex.

In a variation on this aspect, the system can identify a starting vertex for the traversal of the graph.

In a further variation, the depth of the traversal from the starting vertex can be predetermined.

In a variation on this aspect, a first vertex, which corresponds to a first entity of the network, can represent a set of attributes associated with the first entity. Here, one of the set of attributes is a unique identifier identifying the vertex in the graph.

In a variation on this aspect, upon receiving a second instruction from the interface of the management system, the system can determine a second topology, a second set of network states, and a second set of configurations of the network at a second target time instance indicated by the second instruction by performing a second traversal of the graph. The system can then determine the difference between the first and second topologies and the difference between the first and second sets of configurations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
  generating, by a network management system, a graph representing configuration, states, and topology of a network, wherein a respective vertex of the graph corresponds to an entity in the network, and wherein a respective edge of the graph indicates a relationship between a vertex pair;
  determining, by the network management system, a first timestamp and a second timestamp for a respective edge of the graph, wherein the first timestamp indicates a time instance when a relationship indicated by the edge of the graph is established, wherein the second timestamp indicates a time instance when the relationship indicated by the edge of the graph is terminated, and wherein a time range between the first and second timestamps indicates an active period for the relationship indicated by the edge of the graph;
  receiving, from an interface of the network management system, an instruction for comparing topology, states, and configuration of the network at a target time instance;
  traversing a respective edge of the graph and determining whether a relationship indicated by the edge is active at the target time instance based on the first and second timestamps associated with the edge; and
  determining, by the network management system based on the instruction, a first topology, a first set of network states, and a first set of configurations of the network at the target time instance based on relationships active at the target time instance.

2. The method of claim 1, further comprising, in response to determining a change in the network at a first time instance, changing an edge in the graph.

3. The method of claim 2, further comprising:
  in response to changing of the edge including removal of the edge, setting the first time instance as the second timestamp for the edge; and
  in response to changing of the edge including addition of the edge, setting the first time instance as the first timestamp for the edge, wherein a value greater than the first timestamp is set as the second timestamp for the edge.

4. The method of claim 2, further comprising determining a set of vertices impacted by the change, wherein the set of vertices represent a same entity of the network in the graph, wherein the set of vertices include a primary vertex and a plurality of auxiliary vertices; and wherein the edge is coupled to an auxiliary vertex in the graph.

5. The method of claim 4, wherein changing the edge further comprises coupling the edge to a new primary vertex while the edge remains coupled to the auxiliary vertex in the graph.

6. The method of claim 2, wherein determining the change in the network further comprises determining, at the first time instance, one or more of: a missing attribute, a new attribute, a change attribute, a new vertex, and a missing vertex.

7. The method of claim 1, further comprising identifying a starting vertex for the traversal of the graph.

8. The method of claim 7, wherein a depth of the traversal from the starting vertex is predetermined.

9. The method of claim 1, wherein a respective vertex of the graph corresponds to an entity of the network and represents a set of attributes associated with the entity, and wherein one of the set of attributes is a unique identifier identifying the vertex in the graph.

10. The method of claim 1, further comprising:
in response to a second instruction from the interface of the management system, determining a second topology, a second set of network states, and a second set of configurations of the network at a second target time instance indicated by the second instruction;
traversing a respective edge of the graph and determining whether a relationship indicated by the edge is active at the second target time instance based on the first and second timestamps associated with the edge;
determining a difference between the first and second topologies; and
determining a difference between the first and second sets of configurations based on the difference between the first and second topologies.

11. A non-transitory computer-readable storage medium storing instructions that when executed by a processor of a computer, which facilitates a network management system, to perform a method, the method comprising:
generating a graph representing configuration, states, and topology of a network, wherein a respective vertex of the graph corresponds to an entity in the network, and wherein a respective edge of the graph indicates a relationship between a vertex pair;
determining a first timestamp and a second timestamp for a respective edge of the graph, wherein the first timestamp indicates a time instance when a relationship indicated by the edge of the graph is established, wherein the second timestamp indicates a time instance when the relationship indicated by the edge of the graph is terminated, and wherein a time range between the first and second timestamps indicates an active period for the relationship indicated by the edge of the graph;
receiving, from an interface of the network management system, an instruction for comparing topology, states, and configuration of the network at a target time instance;
traversing a respective edge of the graph and determining whether a relationship indicated by the edge is active at the target time instance based on the first and second timestamps associated with the edge; and
determining, based on the instruction, a first topology, a first set of network states, and a first set of configurations of the network at the target time instance based on relationships active at the target time instance.

12. The non-transitory computer-readable storage medium of claim 11, wherein the method further comprises in response to determining a change in the network at a first time instance, changing an edge in the graph.

13. The non-transitory computer-readable storage medium of claim 12, wherein the method further comprises:
in response to changing of the edge including removal of the edge, setting the first time instance as the second timestamp for the edge; and
in response to changing of the edge including addition of the edge, setting the first time instance as the first timestamp for the edge, wherein a value greater than the first timestamp is set as the second timestamp for the edge.

14. The non-transitory computer-readable storage medium of claim 12, wherein the method further comprises determining a set of vertices impacted by the change, wherein the set of vertices represent a same entity of the network in the graph, wherein the set of vertices include a primary vertex and a plurality of auxiliary vertices; and wherein the edge is coupled to an auxiliary vertex in the graph.

15. The non-transitory computer-readable storage medium of claim 14, wherein changing the edge further comprises coupling the edge to a new primary vertex while the edge remains coupled to the auxiliary vertex in the graph.

16. The non-transitory computer-readable storage medium of claim 12, wherein determining the change in the network further comprises, determining, at the first time instance, one or more of: a missing attribute, a new attribute, a change attribute, a new vertex, and a missing vertex.

17. The non-transitory computer-readable storage medium of claim 11, wherein the method further comprises identifying a starting vertex for the traversal of the graph, wherein a depth of the traversal from the starting vertex is predetermined.

18. The non-transitory computer-readable storage medium of claim 11, wherein a respective vertex of the graph corresponds to an entity of the network and represents a set of attributes associated with the entity, and wherein one of the set of attributes is a unique identifier identifying the vertex in the graph.

19. The non-transitory computer-readable storage medium of claim 11, wherein the method further comprises:
in response to a second instruction from the interface of the management system, determining a second topology, a second set of network states, and a second set of configurations of the network at a second target time instance indicated by the second instruction;
traversing a respective edge of the graph and determining whether a relationship indicated by the edge is active at the second target time instance based on the first and second timestamps associated with the edge;
determining a difference between the first and second topologies; and
determining a difference between the first and second sets of configurations based on the difference between the first and second topologies.

20. A computer system, comprising:
a processor; and
a non-transitory computer-readable storage medium storing instructions to:
generate a graph representing configuration, states, and topology of a network, wherein a respective vertex of the graph corresponds to an entity in the network, and wherein a respective edge of the graph indicates a relationship between a vertex pair; and
determine a first timestamp and a second timestamp for a respective edge of the graph, wherein the first timestamp indicates a time instance when a relationship indicated by the edge of the graph is established, wherein the second timestamp indicates a time instance when the relationship indicated by the edge of the graph is terminated, and wherein a time range between the first and second timestamps indicates an active period the relationship indicated by for the edge of the graph;
receive, from an interface of the computer system, an instruction for comparing topology, states, and configuration of the network at a target time instance;

traverse a respective edge of the graph and determine whether a relationship indicated by the edge is active at the target time instance based on the first and second timestamps associated with the edge; and determine a topology, a set of network states, and a set of configurations of the network at the target time instance based on relationships active at the target time instance.

\* \* \* \* \*